(12) United States Patent
Gillet et al.

(10) Patent No.: US 10,919,255 B2
(45) Date of Patent: Feb. 16, 2021

(54) TRIM PANEL FOR A MOTOR VEHICLE

(71) Applicant: TREVES PRODUCTS, SERVICES & INNOVATION, Paris (FR)

(72) Inventors: Christophe Gillet, Reims (FR); Jérôme Herat, Reims (FR); Eric Brillon, Reims (FR); Anthony Ellis, Reims (FR)

(73) Assignee: TREVES PRODUCTS, SERVICES & INNOVATION, Paris (FR)

( * ) Notice: Subject to any disclaimer, the term of this patent is extended or adjusted under 35 U.S.C. 154(b) by 0 days.

(21) Appl. No.: 16/481,602

(22) PCT Filed: Jan. 31, 2018

(86) PCT No.: PCT/FR2018/050219
§ 371 (c)(1),
(2) Date: Jul. 29, 2019

(87) PCT Pub. No.: WO2018/142062
PCT Pub. Date: Aug. 9, 2018

(65) Prior Publication Data
US 2020/0001564 A1 Jan. 2, 2020

(30) Foreign Application Priority Data
Jan. 31, 2017 (FR) ...................................... 17 50776

(51) Int. Cl.
*B32B 3/04* (2006.01)
*B32B 3/02* (2006.01)
(Continued)

(52) U.S. Cl.
CPC .................. *B32B 3/02* (2013.01); *B32B 5/18* (2013.01); *B32B 27/065* (2013.01); *B32B 27/34* (2013.01);
(Continued)

(58) Field of Classification Search
CPC ............... B60R 13/02; Y10T 428/2419; Y10T 428/24207; Y10T 428/24215–24264;
(Continued)

(56) References Cited

FOREIGN PATENT DOCUMENTS

EP 2974911 A1 1/2016
FR 3010687 A1 3/2015
(Continued)

OTHER PUBLICATIONS

Abstract of JP2000225645-A (Year: 2000).*
(Continued)

*Primary Examiner* — Alexander S Thomas
(74) *Attorney, Agent, or Firm* — Murtha Cullina LLP

(57) ABSTRACT

The invention is a trim panel having a moulded structural core. The core has two edges connected to each other along a joint, the joint is convex and radiated. The edges are connected to each other gradually, and the core has a back face and a front face. The front face is coated with a glued front coating, the coating having a peripheral edging folded against the periphery of the back face. The back face is provided, in the vicinity of the joint, with a plurality of substantially straight grooves arranged in a fan, the grooves receiving, glued therein, the folds formed in the edging in the vicinity of the joint.

7 Claims, 1 Drawing Sheet

(51) Int. Cl.
   *B32B 5/18* (2006.01)
   *B32B 27/06* (2006.01)
   *B32B 27/34* (2006.01)
   *B32B 27/40* (2006.01)
   *B60R 5/04* (2006.01)

(52) U.S. Cl.
   CPC ............. *B32B 27/40* (2013.01); *B32B 3/04* (2013.01); *B32B 2266/0278* (2013.01); *B32B 2605/003* (2013.01); *B60R 5/044* (2013.01); *Y10T 428/2424* (2015.01); *Y10T 428/24215* (2015.01); *Y10T 428/24264* (2015.01)

(58) Field of Classification Search
   CPC ... Y10T 428/24479–24537; Y10T 428/24612; Y10T 428/2462; B32B 3/04
   See application file for complete search history.

(56) References Cited

FOREIGN PATENT DOCUMENTS

FR   3037883 A1   12/2016
JP   2000225645 A * 8/2000

OTHER PUBLICATIONS

Machine translation of Abstract of JP2000225645 (Year: 2020).*
International Search Report issued in corresponding application No. PCT/FR2018/050219 dated Apr. 25, 2018.

* cited by examiner

TRIM PANEL FOR A MOTOR VEHICLE

CROSS-REFERENCE TO RELATED APPLICATION

This application claims the benefit of International application number PCT/FR2018/050219, filed Jan. 31, 2018 and French application number 1750776, filed Jan. 31, 2017 the entire contents of which are incorporated herein by reference.

TECHNICAL FIELD

The invention relates to a trim panel for a motor vehicle and a method for producing such a panel.

BACKGROUND

It is known to produce a trim panel for a motor vehicle, the panel comprising a moulded structural core, the panel further having the following features:
   the core has, as seen from above, two edges connected to each other along a joint,
   the joint is convex and radiated such that the edges are connected to each other gradually,
   the core has a back face and a front face, the front face being coated with a glued front coating, the coating having a peripheral edging folded against the periphery of the back face.

When it is said that the joint is radiated, it means that it does not form a sharp angle but is curved so as to avoid any sharp edge that might be detrimental to a good finish in the joint.

In fact, radiating the joint makes it possible to minimize, at the joint, the formation of folds that produce added thicknesses of front coating at the periphery of the back face.

However, residual folds remain, which interferes with optimal peripheral finishing in the joint.

SUMMARY OF THE INVENTION

The invention is intended to propose an arrangement that makes it possible to produce an optimal peripheral finishing in the join, in spite of the presence of such residual folds.

To this end, the invention proposes a trim panel for a motor vehicle, the panel comprising a moulded structural core, the panel further having the following features:
   the core has, as seen from the above, two edges connected to each other along a joint,
   the joint is convex and radiated such that the edges are connected to each other gradually,
   the core has a back face and a front face, the front face being coated with a glued front coating, the coating having a peripheral edging folded against the periphery of the back face,
   the back face is provided, in the vicinity of the joint, with a plurality of substantially straight grooves arranged in a fan,
   the grooves receive, glued therein, the folds formed in the edging in the vicinity of the joint.

With the proposed arrangement, a particularly aesthetic and robust peripheral finishing is obtained, at the joint of the panel, in which the folds formed in the edging of the front coating near the joint are received in the grooves.

BRIEF DESCRIPTION OF THE DRAWINGS

Other special features and advantages of the invention will appear in the following description, provided in reference to the appended figures, wherein.

DETAILED DESCRIPTION

Figure 1:
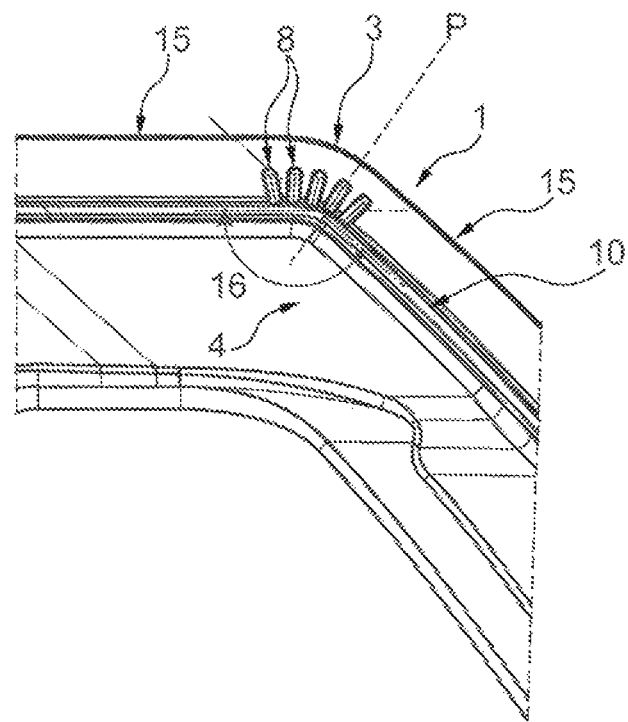
FIG. 1 is a partial schematic front view of a panel according to an embodiment.
Figure 2:
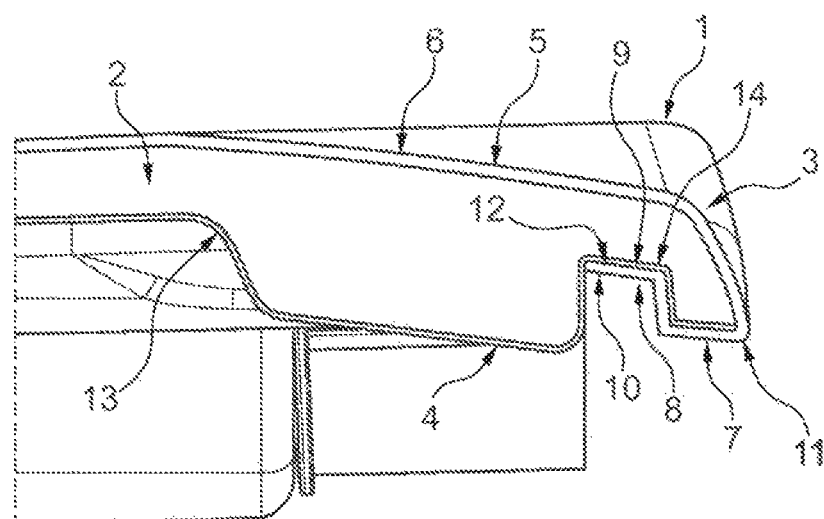
FIG. 2 is a partial schematic cross-section view of the panel shown in FIG. 1 according to a plane P.

In reference to the figures, a trim panel 1 for a motor vehicle is described, for example in the form of a covering shelf of a luggage compartment, the panel comprising a moulded structural core 2, for example based on rigid or semi-rigid polyurethane foam, the panel also having the following features:
   the core has, as seen from above, two edges 15 connected to each other along a joint 3,
   the joint is convex and radiated such that the edges are connected to each other gradually,
   the core has a back face 4 and a front face 5, the front face being coated with a glued front coating 6, for example carpet-based, the coating having a peripheral edging 7 folded against the periphery of the back face,
   the panel also having the following features:
   the back face is provided, in the vicinity of the joint, with a plurality of substantially straight grooves 8 arranged in a fan,
   the grooves receive, glued therein, the folds 9 formed in the edging in the vicinity of the joint.

In particular, the panel 1 may include a plurality of joints 3 near which the back face 4 is provided with a plurality of substantially straight grooves 8 arranged in a fan, the grooves receiving, glued therein, the folds 9 formed in the edging 7 in the vicinity of the joints.

According to the embodiment shown, the joint 3 is radiated substantially in an arc of circle, the grooves 8 extending substantially along radii of the circle.

According to an embodiment, the radius has a value of between 5 and 20 mm.

According to the embodiment shown, the back face 4 is provided with a peripheral slot 10 extending along and at a distance from the edge of the face, a portion 12 of the edging 7 being inserted into the slot so as to be hidden.

According to the embodiment shown, the grooves 8 open into the slot 10, so as to facilitate the insertion of the edging 7 into the slot.

According to the embodiment shown, the grooves 8 have a depth equivalent to that of the slot 10.

According to the embodiment shown, the panel 1 also includes a back coating 13—for example based on a non-woven material—glued to the back face 4, the peripheral edging 14 of the coating being inserted into the slot 10.

According to the embodiment shown, the edging 14 also extends into the grooves 8.

According to the embodiment shown, the edging 14 also extends beyond the grooves 8 to the edge 11 of the back face 4.

According to an embodiment, the gluing of the front 6 and/or back 13 coating is achieved by means of a fusible film, for example of the co-polyamide type.

According to the embodiment shown, the back face of one of the coatings 6, 13—in this case the front coating 6—overlaps the front face of the other of the coatings 13, 6—in this case the back coating 13—in the slot 10.

According to an embodiment, the width of the opening of the slot 10 is between 3 and 10 mm.

According to an embodiment, the depth of the slot 10 is between 5 and 15 mm.

What is claimed is:

1. A trim panel for a motor vehicle, the panel comprising a moulded structural core,
   the core having two edges connected to each other along a joint,
   the joint is convex and radiated wherein the edges are connected to each other gradually,
   the core has a back face and a front face, the front face being coated with a glued carpet based front coating, the coating having a peripheral edging folded against the periphery of the back face,
the panel wherein:
   the back face is provided, in the vicinity of the joint, with a plurality of substantially straight grooves arranged in a fan,
   the grooves receive, glued therein, the folds formed in the edging in the vicinity of the joint, the back face is further provided with a peripheral slot extending along and at a distance from the edge of the face, a portion of the edging being inserted into the slot to be hidden, and wherein the grooves of the back face open into the peripheral slot.

2. The panel according to claim 1, wherein the joint is radiated substantially in an arc of circle, the grooves extending substantially along radii of the circle.

3. The panel according to claim 1, wherein the grooves have a depth equivalent to that of the slot.

4. The panel according to claim 1, wherein it also includes a back coating glued on the back face, the peripheral edging of the coating being inserted into the slot.

5. The panel according to claim 4, wherein the edging of the back coating also extends into the grooves.

6. The panel according to claim 5, wherein the edging of the back coating also extends beyond the grooves to the edge of the back face.

7. The panel according to claim 4, wherein the back face of one of the coatings overlaps the front face of the other of the coatings in the slot.

* * * * *